(12) United States Patent
Virga (10) Patent No.: US 8,433,344 B1
(45) Date of Patent: Apr. 30, 2013

(54) DISPLAYING A TIER OF RISK IN A REGION OF A MAP DISPLAYED VIA A MOBILE COMPUTING DEVICE

(76) Inventor: David Virga, Bronx, NY (US)

( * ) Notice: Subject to any disclaimer, the term of this patent is extended or adjusted under 35 U.S.C. 154(b) by 54 days.

(21) Appl. No.: 13/197,432

(22) Filed: Aug. 3, 2011

Related U.S. Application Data (60) Provisional application No. 61/372,991, filed on Aug. 12, 2010.

(51) Int. Cl.
*H04W 24/00* (2009.01)
(52) U.S. Cl.
USPC .......................................... 455/457; 701/454
(58) Field of Classification Search ............... 455/457; 701/454
See application file for complete search history.

(56) References Cited

U.S. PATENT DOCUMENTS

| | | | |
|---|---|---|---|
| 6,175,803 B1 * | 1/2001 | Chowanic et al. ............ 701/533 |
| 7,109,859 B2 | 9/2006 | Peeters | |
| 7,149,533 B2 * | 12/2006 | Laird et al. ................. 455/456.3 |
| 7,191,097 B1 | 3/2007 | Lee et al. | |
| 7,236,100 B2 | 6/2007 | Obradovich et al. | |
| 7,321,826 B2 | 1/2008 | Sheha et al. | |
| 7,345,628 B2 | 3/2008 | Soundararajan | |
| 7,650,234 B2 | 1/2010 | Obradovich et al. | |
| 7,702,455 B2 | 4/2010 | Obradovich et al. | |
| 2003/0006913 A1 | 1/2003 | Joyce et al. | |
| 2006/0247852 A1 * | 11/2006 | Kortge et al. ................. 701/209 |
| 2008/0094230 A1 | 4/2008 | Mock et al. | |
| 2009/0157302 A1 * | 6/2009 | Tashev et al. ................. 701/206 |
| 2010/0036599 A1 | 2/2010 | Froeberg et al. | |
| 2010/0036610 A1 * | 2/2010 | Urciuoli et al. .............. 701/213 |
| 2010/0100319 A1 * | 4/2010 | Trinko et al. ................. 701/212 |
| 2011/0099180 A1 * | 4/2011 | Arrasvuori .................... 707/754 |

* cited by examiner

*Primary Examiner* — Lester Kincaid
*Assistant Examiner* — Isaak R Jama
(74) *Attorney, Agent, or Firm* — Goldstein Law Offices, P.C.

(57) ABSTRACT

A computer-implement method for displaying a tier of risk in a region of a map displayed via a mobile computing device. The method includes displaying, in real-time on the map, a present location of the mobile computing device. The method also includes retrieving data corresponding to the tier of risk for the region shown on the map. The method further includes marking, according to a predefined marking technique, the region of the map according to the retrieved data.

36 Claims, 7 Drawing Sheets

DISPLAYING A TIER OF RISK IN A REGION OF A MAP DISPLAYED VIA A MOBILE COMPUTING DEVICE

CROSS-REFERENCE TO RELATED APPLICATIONS

This application claims priority to and benefit of U.S. Provisional Application No. 61/372,991, filed on Aug. 12, 2010, which is herein incorporated by reference in its entirety.

TECHNICAL FIELD

The invention relates generally to a software application for a mobile device capable of location positioning. More particularly, the invention relates to a mobile phone application for displaying a high crime area on a map.

BACKGROUND

Frequently, circumstances arise when a person finds himself in an unknown area. If one is in a place he is familiar with, then danger can be avoided. However, if a person is in an unfamiliar place, then he might not know where the danger lurks. For example, a traveler to New Orleans could get lost walking through Bourbon Street and see a different side of New Orleans: the part of the city known for its very high crime rate. The traveler finding himself in New Orleans for the first time would not know which parts of the city were dangerous and which were safe.

A cellular telephone is a widely used mobile device. Many cellular telephones are smartphones, which often include a relatively precise location positioning technology, such as GPS or signal triangulation.

While the foregoing may be suitable for the particular purpose employed, or for general use, they would not be as suitable for the purposes of the present invention as disclosed hereafter.

BRIEF SUMMARY

An example embodiment of the invention includes a computer-implement method for displaying a tier of risk in a region of a map displayed via a mobile computing device. The method includes displaying, in real-time on the map, a present location of the mobile computing device. The method also includes retrieving data corresponding to the tier of risk for the region shown on the map. The method further includes marking, according to a predefined marking technique, the region of the map according to the retrieved data.

Another example embodiment of the invention includes a computer program product for displaying a tier of risk in a region of a map displayed via a mobile computing device. The computer program product includes a tangible storage medium readable by a processing circuit and storing instructions for execution by the processing circuit for performing a method. The method includes displaying, in real-time on the map, a present location of the mobile computing device. The method also includes retrieving data corresponding to the tier of risk for the region shown on the map. The method further includes marking, according to a predefined marking technique, the region of the map according to the retrieved data.

Yet another example embodiment of the invention includes a system for displaying a tier of risk in a region of a map displayed via a mobile computing device. The system includes a computer processor and an application configured to execute on the computer processor. The application implements a method. The method includes displaying, in real-time on the map, a present location of the mobile computing device. The method also includes retrieving data corresponding to the tier of risk for the region shown on the map. The method further includes marking, according to a predefined marking technique, the region of the map according to the retrieved data.

To the accomplishment of at least one of the above and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DETAILED DESCRIPTION OF THE PREFERRED EMBODIMENTS

It is an object of one aspect of the invention to provide a cellular telephone application allowing users to view a local street map in which different sections of the map are color-coded based upon historical crime data. Accordingly, an example embodiment of the invention utilizes a GPS signal to obtain the cellular telephone's present location and then accesses a database of street maps to display a map of the cellular telephone's present location on the cellular telephone's display. Allowing the viewing of historical crime data in this manner aids a user in avoiding a dangerous area and provides a benefit to his safety. In order to display the crime data, the application accesses a crime statistics database and a relative level of crime is displayed as a section of the map with different coloration from the rest of the map, such as with red indicating the greatest danger, orange the next greatest, yellow the third and green for a zone of the least danger.

It is a further object of another aspect of the invention to provide a direction based upon avoidance of a high crime area. Accordingly, an example embodiment of the invention has a direction providing feature to provide a turn-by-turn direction, which avoids a high crime area.

It is also an object of yet another aspect of the invention to create a crime statistics database that associates a region with historical data on crime rates. Accordingly, in an example embodiment of the invention, the database compiles a crime statistic by a zip code and the zip code is further subdivided geographically, if a sufficiently detailed statistic is available. Some categories of crime statistics tracked include the number of murders, rapes, robberies, assaults, burglaries, thefts, auto thefts and arson that occur. In addition to tracking a statistic by the zip code, statistics are also tracked by year, which allows a user of an example embodiment of the invention to track whether a neighborhood is "improving" or "worsening" year by year. In an example embodiment of the invention, the crime statistics database is located in the memory of the cellular telephone and periodically updated with new statistics. In another example embodiment of the invention, the database is located remotely and is contacted by the cellular telephone each time new data is requested.

It is an additional object of even another aspect of the invention to provide information on whether an area is "improving" or "worsening." Accordingly, in an example embodiment of the invention, the crime statistics database tracks a crime statistic over a number of years and can be accessed to compare statistics for an area for the present year versus statistics for prior years to determine the relevant data.

It is yet a further object of yet another aspect of the invention to display crime statistics data in a table form when a pointing device is "rolled over" an area. The display occurs in a pop-up window as an alternate to displaying different sections of a street map color-coded to indicate crime levels. Accordingly, in an example embodiment of the invention, when a pointing device is used to place a mouse cursor over an area, after a relatively brief time interval, a pop-up window appears with a crime statistic for the area listed in a table form. In an example embodiment running on a touchscreen smartphone, simply touching the touchscreen with a finger over the area will have the same effect as placing a mouse cursor over the area and display crime statistics data in table form.

It is also an object of even another aspect of the invention to provide a customized map, which highlights certain crime data to a user interested in more specific information. Once the crime data the user is interested in is selected, an example embodiment of the invention will provide a color-coded map, which displays the likelihood of just the selected types of crimes. For example, whereas an individual interested in buying a house in an area would generally be interested in the number of arsons and burglaries in the area, a person interested in jogging in an area would be interested in the number of assaults, rapes and murders so as to reduce the potential for any harmful encounters. Compilation of statistics in this manner makes an example embodiment of the invention useable not to just travelers, but to many other individuals. When a user requests certain crime data, a customized map is provided, which displays a color-coded map with different colors, such as the highest level of risk indicated in red, orange the second highest, yellow the third and green the lowest level of risk.

It is still a further object of yet another aspect of the invention to display on a street map a point of interest, such as a police precinct, a fire house and other emergency services as well as telephone numbers to contact them. Accordingly, in an example embodiment, when a user of the system requests a location of a point of interest, the requested locations are displayed as icons on the map. If the user selects the requested location on the smartphone, a window appears with the name of the point of interest, the phone number and the street address. Escape routes in case of a natural disaster are displayed as well, if requested.

Figure 1:
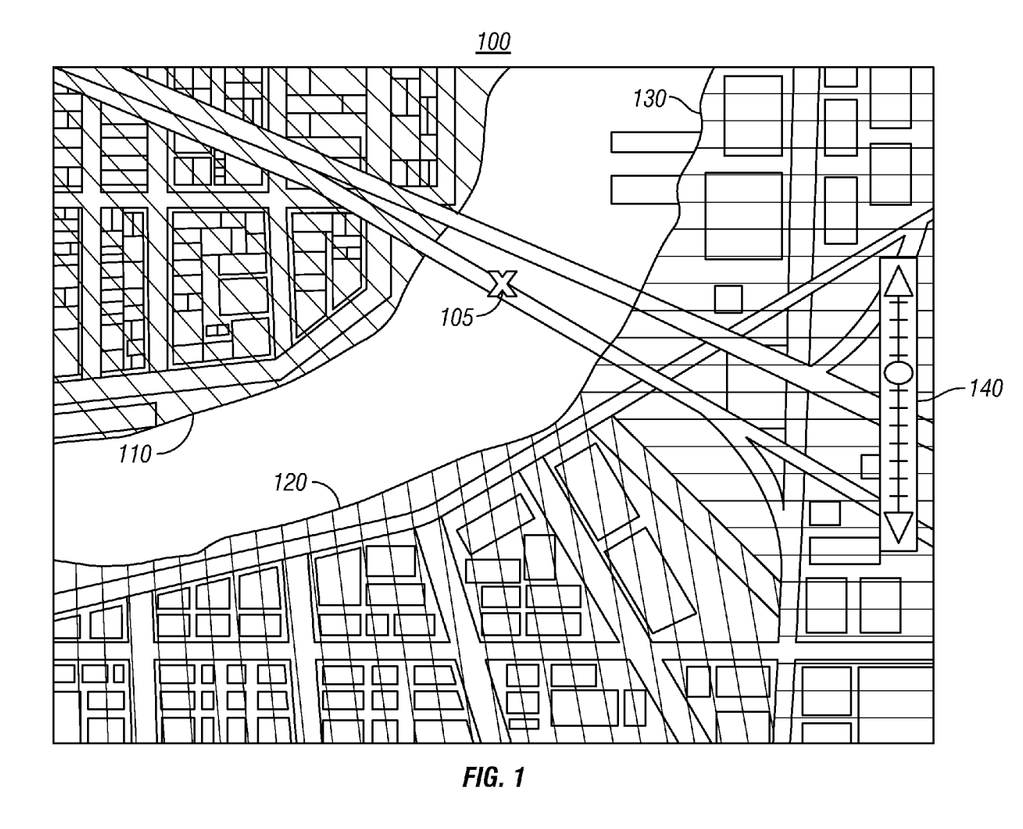
FIG. 1 is a diagram of an example embodiment of a color-coded map displayed on a cellular telephone display according to the present invention.

FIG. 1 is a diagram of an example embodiment of a color-coded map displayed on a cellular telephone display according to the present invention. A street map 100 is displayed on a display of a cellular phone. Street map 100 illustrates a present location X 105 and regions 110, 120 and 130.

A zoom level of street map 100 can be changed with a zoom toolbar 140. In an example embodiment, zoom toolbar 140 is positioned on one side of street map 100, such as the right side of street map 100.

Street map 100 is displayed with the cellular telephone's (and, presumably, a user's) present location marked at "X" 105 on the street map.

In an example embodiment, regions 110, 120 and 130 of the street map 100 are shaded with one shading indicating a same relative level of risk for regions 110, 120 and 130. However, in another example embodiment, different regions 110, 120 and 130 of the street map 100 are shaded differently with different shadings indicating different relative levels of risk.

In an example embodiment, street map 100 is displayed on a cellular telephone display with each region 110, 120 and 130 having a different color. Each color corresponds to a tier of risk, such as crime level. Thus, regions 110, 120, 130 would appear as different colors indicating tiers of risk, such as with red indicating the highest tier of risk, orange the second highest, yellow the third and green the lowest level.

Figure 2:
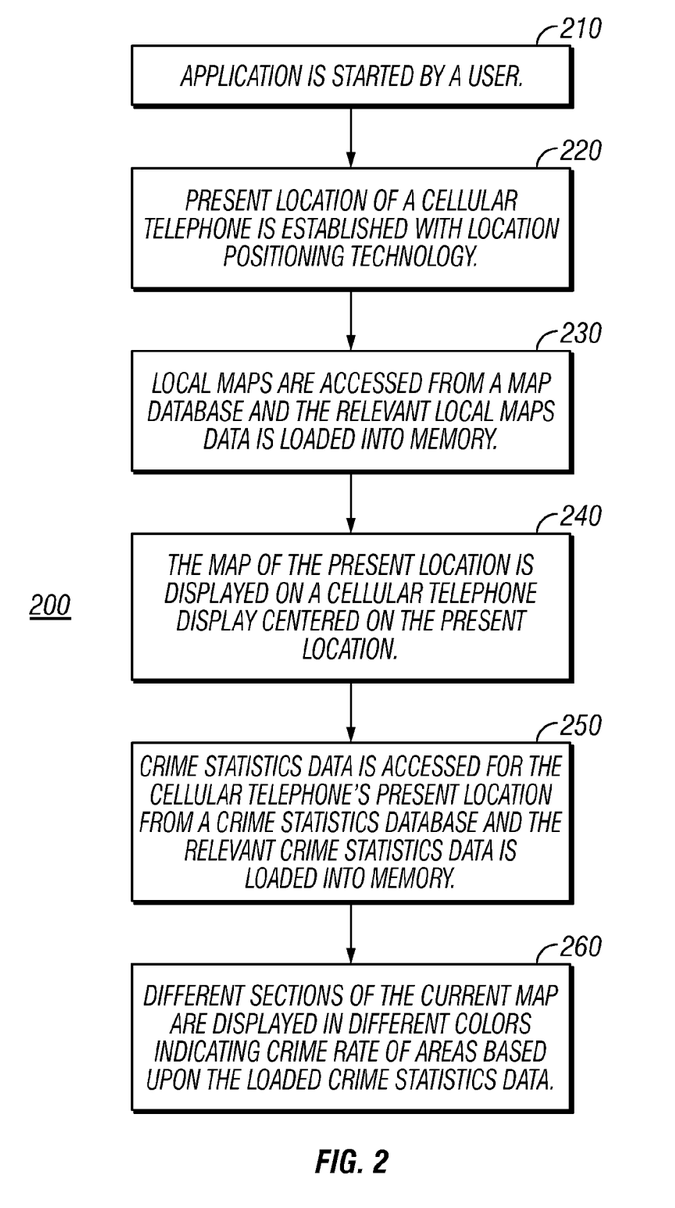
FIG. 2 is a flowchart of an example embodiment of a process for displaying different levels of risk according to the present invention.

FIG. 2 is a flowchart of an example embodiment of a process for displaying different levels of risk according to the present invention. A process 200 includes steps 210, 220, 230, 240, 250 and 260.

Step 210 is a software application is started by a user. The software application is started on a cellular telephone, such as a smartphone.

Step 220 is the software application establishes a present location of the cellular telephone with a location positioning technology, such as GPS or signal triangulation.

Step 230 is the software application accesses a local maps database to retrieve the relevant local maps of the location where the cellular telephone is presently located and the retrieved relevant local maps are loaded into the cellular telephone's memory. In one example embodiment, the software wirelessly accesses and retrieves the local maps from the local maps database.

Step 240 is the software application displays the current map on the cellular telephone's display. On the cellular telephone's display, the current map is displayed centered on the present location.

Step 250 is the software application accesses a crime statistics database to retrieve the crime statistics data corresponding to the cellular telephone's present location and the retrieved crime statistics data is loaded into memory of the cellular telephone. In one example embodiment, the local maps data and the crime statistics data are stored in one database.

Step 260 is the software application overlays different sections of the displayed map in different colors, which indicate the crime rate of the area based upon the loaded crime statistics data. In an example embodiment, displaying sections of the map in different colors offers the advantage of being immediately accessible to the user of the system and translates into the immediate ability to avoid dangerous areas.

Figure 3:
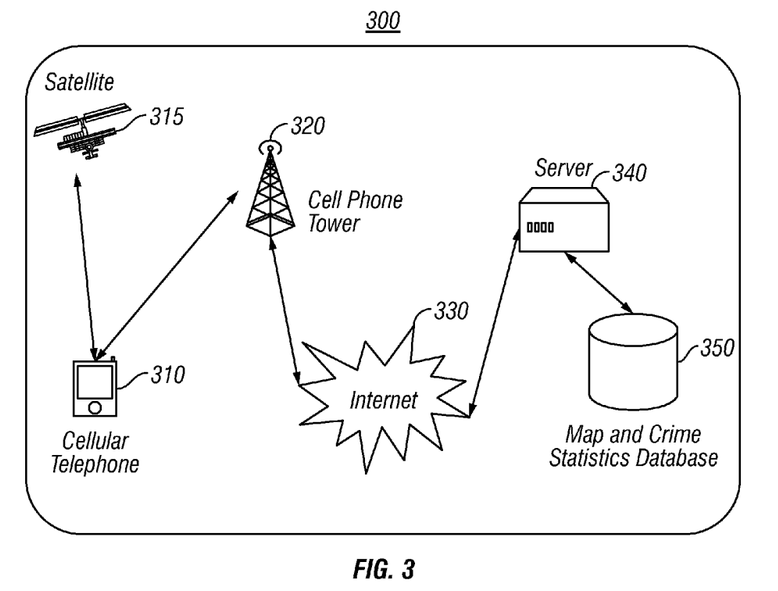
FIG. 3 is a schematic diagram of an example network environment according to the present invention.

FIG. 3 is a schematic diagram of an example network environment according to the present invention. A network environment 300 includes a satellite 315, a cellular telephone 310, a cell phone tower 320, an Internet 330, a server 340 and a map and crime statistics database 350.

Cellular telephone 310 obtains its present location by gathering data from global positioning satellite 315, by triangulating its position with cellular telephone tower 320 or by using a combination of these location positioning methods.

Once the location is obtained, cellular telephone 310 connects with cell phone tower 320 to request the local maps and crime statistics data corresponding to cellular telephone 310 present location. The local maps and crime statistics data is obtained by connecting to server 340 via cellular telephone tower 320 connected to Internet 330. A connection is made with server 340 and the local maps and crime statistics data for the region are downloaded from database 350 via server 340 connected to Internet 330 and via cell phone tower 320 to cellular telephone 310. After the local map and crime statistics data are received and processed the software application on cellular telephone 310, the local map with tiers of risk corresponding to downloaded crime statistics data are displayed on the cellular telephone's display 310. In one example embodiment, the software application overlays different sections of the displayed map in different colors, which indicate the crime rate of the present location based upon the downloaded crime statistics data.

Figure 4:
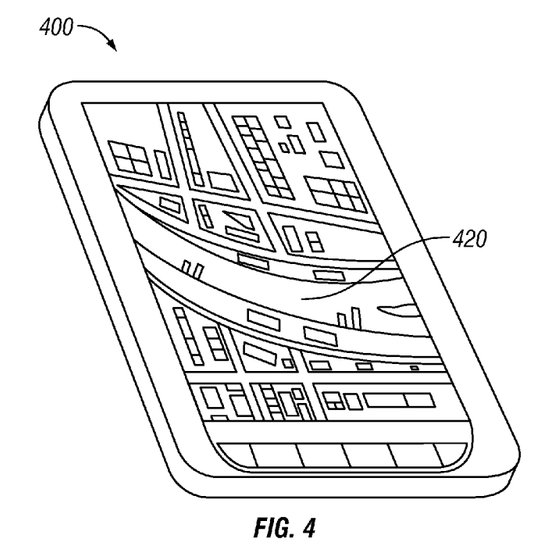
FIG. 4 is a perspective view of an example embodiment of a cellular telephone running a software application according to the present invention.

FIG. 4 is a perspective view of an example embodiment of a cellular telephone running a software application according to the present invention. A cellular telephone 400 displays a map 420. In an example embodiment, the cellular phone includes a liquid crystal display (LCD) and using a zooming means, such as a zoom toolbar or finger actions, the map 420 can be selectively or automatically zoomed-in and zoomed-out, displaying a narrow or wide area of map 420. In an example embodiment, the software application overlays different sections of the displayed map 420 in different colors, which indicate the crime rate of the present location based upon the downloaded crime statistics data.

Figure 5:
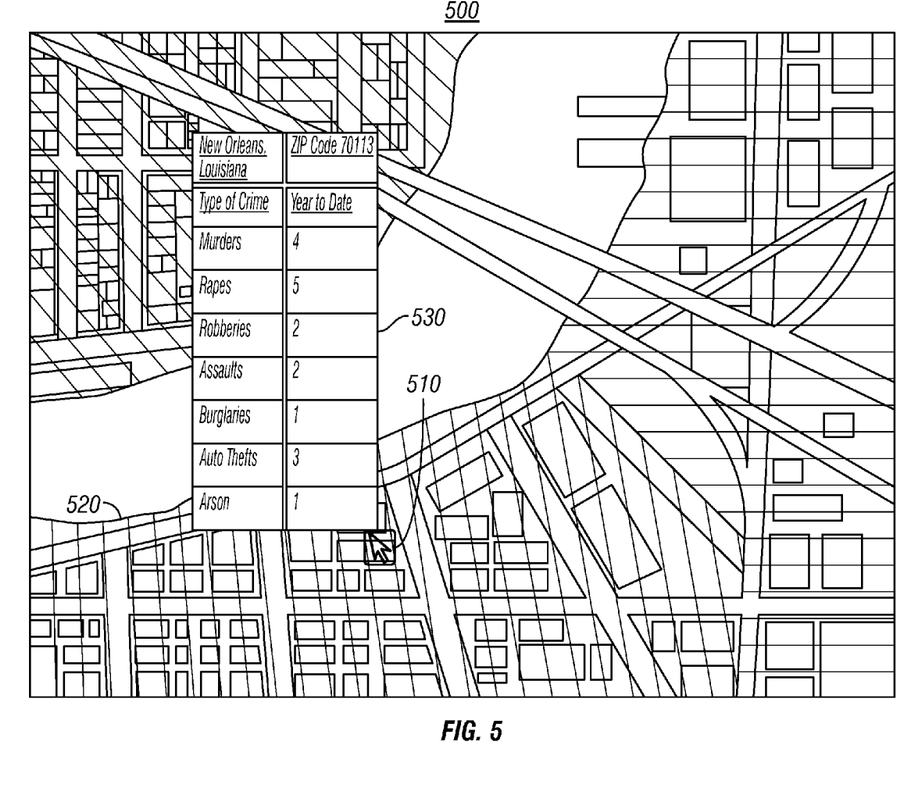
FIG. 5 is a diagram of another example embodiment of a color-coded map with detailed crime information displayed on a cellular telephone display according to the present invention.

FIG. 5 is a diagram of another example embodiment of a color-coded map with detailed crime information displayed on a cellular telephone display according to the present invention. A street map 500 is displayed on a display of a cellular phone. Street map 500 illustrates a region 520.

A window 530 is displayed over street map 500.

A cursor 510 is controllable by a user of the cellular telephone and a movement and a current position of cursor 510 is displayed over street map 500. In one example embodiment, a portion of cursor 510 is transparent. Cursor 510 is dragged across the cellular telephone display highlighting region 520 of street map 500 where crime statistics are available. If cursor 510 is left stationary for a time period, such as a few seconds, over region 520, window 530 appears on street map 500. Window 530 displays detailed crime information about region 520. In one example embodiment, windows 530 displays data corresponding to a number of murders, rapes, robberies, assaults, burglaries, auto thefts or acts of arson in region 520 in the year to date. In one example embodiment, display of window 530 provides more detailed information to a user and would be utilized in different ways based upon the needs of the user, such as if the user was interested in jogging in the area versus interested in buying a house in the area.

Figure 6:
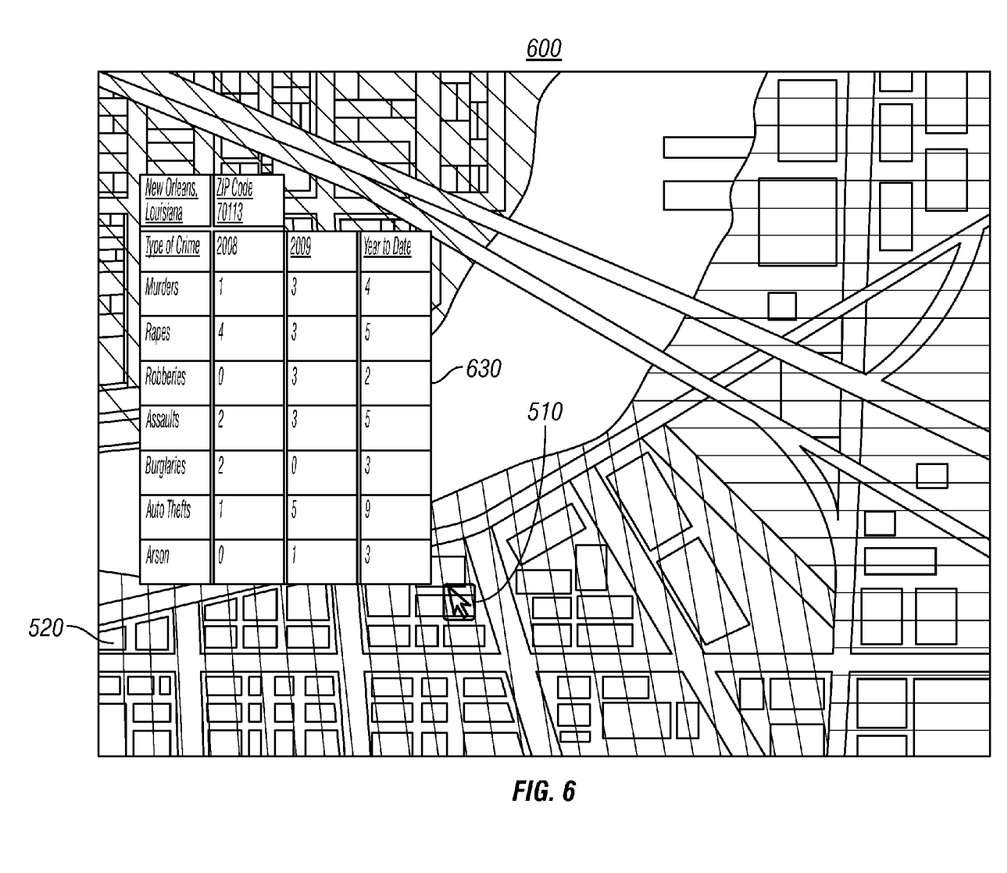
FIG. 6 is a diagram of yet another example embodiment of a color-coded map with detailed crime information over a time period displayed on a cellular telephone display according to the present invention.

FIG. 6 is a diagram of yet another example embodiment of a color-coded map with detailed crime information over a time period displayed on a cellular telephone display according to the present invention. A street map 600 is displayed on a display of a cellular phone. Street map 600 illustrates region 520.

A window 630 is displayed over street map 600.

When cursor 510 is left stationary for a time period, such as a few seconds, window 630 appears with crime statistics for region 520 for the present year to date as well as for the two previous years, such as 2008 and 2009. In one example embodiment, comparison of the data presented indicates a higher number of murders, rapes, assaults, auto thefts or arson in the year to date than in the two previous years. In one example embodiment, the data displayed within window 630 allows the user to determine that crime in region 520 is worsening and buying a home in the area is probably unwise.

Figure 7:
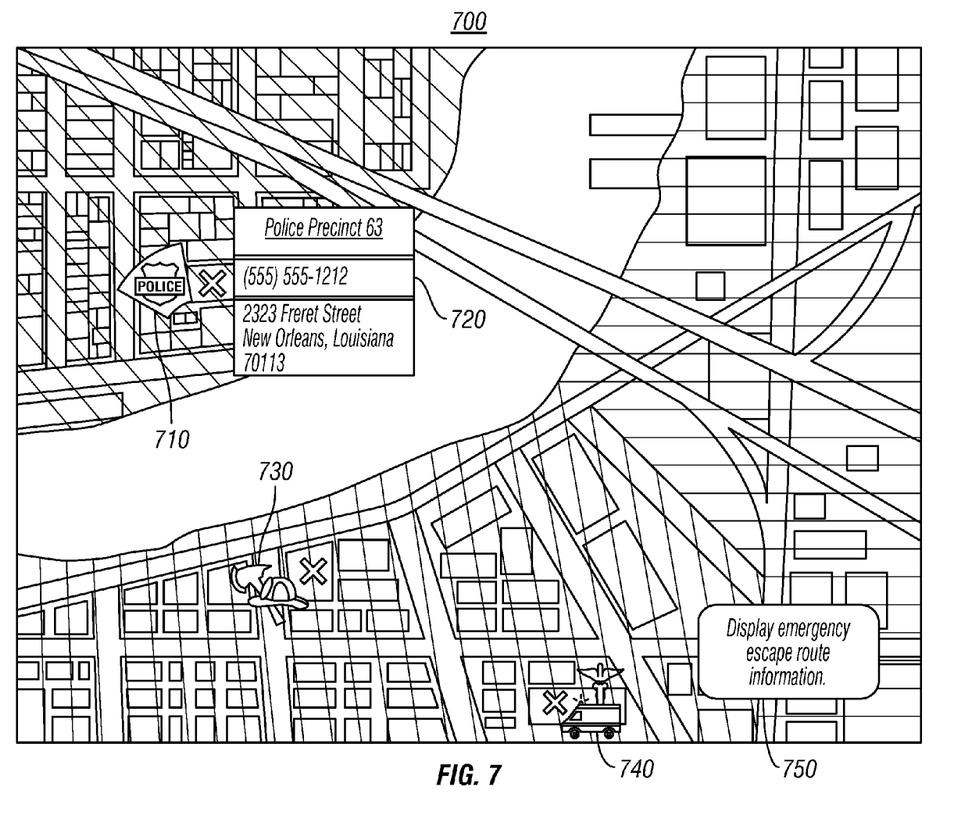
FIG. 7 is a diagram of yet even another example embodiment of a color-coded map displaying a point of interest on a cellular telephone display according to the present invention.

FIG. 7 is a diagram of yet even another example embodiment of a color-coded map displaying a point of interest on a cellular telephone display according to the present invention. A street map 700 is displayed on a display of a cellular phone. Street map 700 illustrates points of interest, such as a police station location 710, a fire station location 730 and a hospital location 740.

A window 720 is displayed over street map 700.

A button 750 is displayed over street map 700. The button can be pressed via a cursor or a finger action, such as a touch or tap, if the screen is a touchscreen. In one example embodiment, button 750 is displayed in a corner of street map 700. If a user presses button 750, then information corresponding to emergency escape route from the current position is displayed. In one example embodiment, the emergency escape route information is travel directions, such as driving or walking directions.

If a user selects a point of interest via a cursor or a finger action, window 720 appears over street map 700. Window 720 displays more detailed information, such a name of the point of interest (Police Precinct 63) and contact information of the point of interest, such as non-emergency phone number and a street address.

Figure 8:
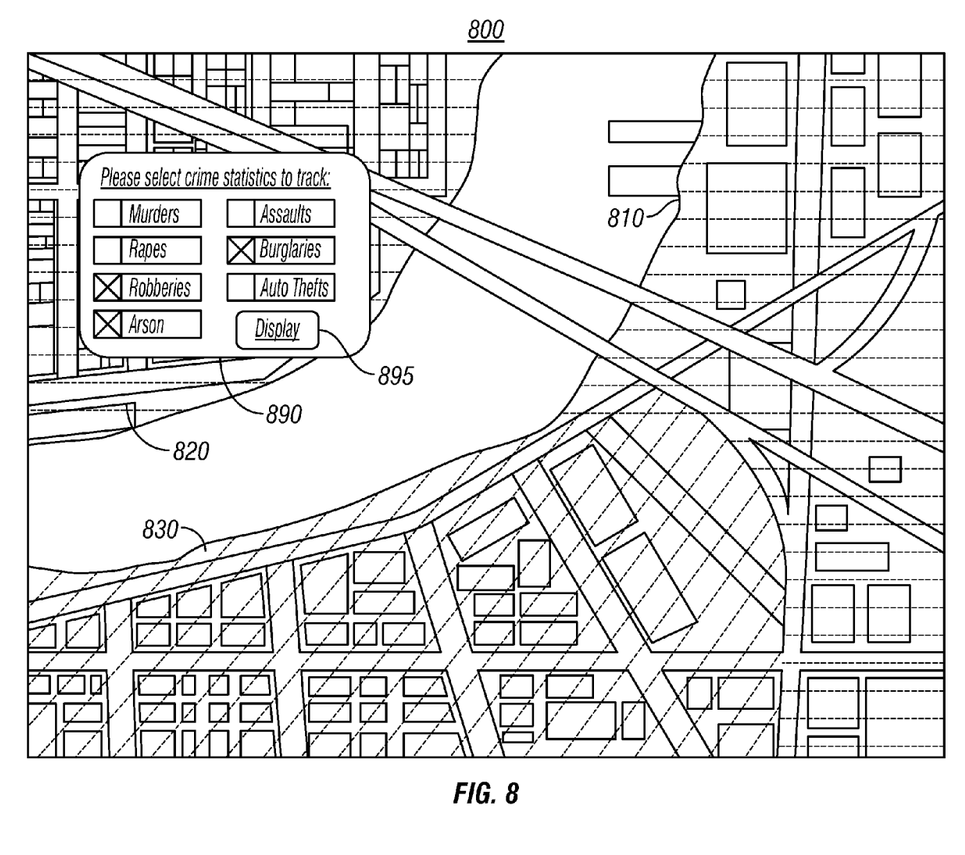
FIG. 8 is a diagram of yet even another example embodiment of a color-coded map displaying on a cellular telephone display and categorizing a danger area based upon a selection of the user according to the present invention.

FIG. 8 is a diagram of yet even another example embodiment of a color-coded map displaying on a cellular telephone display and categorizing a danger area based upon a selection of the user according to the present invention. A street map 800 is displayed on a display of a cellular phone. Street map 800 illustrates regions 810, 820 and 830.

A window 890 is displayed over street map 800. A display button 895 is displayed within window 890. A label and a corresponding checkbox are also displayed within window 890.

The software application displaying street map 800 allows a user to select which statistics the user is interested in tracking. The selectable statistics to track are displayed within window 890 via the labels. The labels are selectable via the corresponding checkboxes, which are also displayed within window 890. In an example embodiment, the selectable statistics are a number of murders, rapes, robberies, acts of arson, assaults or auto thefts.

As shown in FIG. 8, the user made a selection within window 890 to display a number of robberies, acts of arson and burglaries within street map 800. After the user selected the desired checkboxes, the user clicks display button 895 and different shadings or colors appear on street map 800. Each display color or shading is substantially consistent with the retrieved and loaded crime statistics data corresponding to the cellular telephone present location. Thus, an embodiment of the invention tracks only the statistics requested and then displays different shadings on street map 800 indicating level of risk based only upon statistics for regions 810, 820, 830.

As shown in FIG. 8, the displayed selections are consistent with a user who is interested in buying a house in the area since the displayed selections are primarily threats against real property. Alternatively however, a user interested in jogging, such as a jogger, in at least one of regions 810, 820 and 830 would be interested in personal safety statistics, such as murders, rapes, assaults, but would not be interested in crimes against real property. Thus, a jogger for example may select checkboxes corresponding to labels matching statistics relating to personal safety statistics and unselect checkboxes corresponding to labels matching statistics relating to crimes against real property. Accordingly, the software application will display different color overlays over regions 810, 820 and 830 of street map 800. Each color corresponds to a tier of risk, such as crime level with, for example, red, indicating the highest level of risk of the statistics requested, orange the second highest, yellow the third, and green the lowest level or risk. Thus, regions 810, 820 and 830 would appear as different colors indicating tiers of risk.

In conclusion, herein is presented a system for displaying high crime areas on a cellular telephone with global positioning system capabilities. The invention is illustrated by example in the drawing figures, and throughout the written description. It should be understood that numerous variations are possible, while adhering to the inventive concept. Such variations are contemplated as being a part of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for displaying a tier of risk in a region of a map displayed via a mobile computing device, the method comprising:
    displaying, in real-time on the map, a present location of the mobile computing device;
    retrieving data corresponding to the tier of risk for the region shown on the map;
    marking, according to a predefined marking technique, the region of the map according to the retrieved data; and
    displaying an escape icon over the marked map, wherein in response to selecting the escape icon, an emergency escape route from the present location to a safer location is displayed on the marked map based on the retrieved data, wherein upon an occurrence of an event, a crime trend window is displayed over the marked map, the crime window presents a name of the region and a number of at least one of a murder, a rape, a robbery, an assault, a burglary, an auto theft and an act of arson for a first time period for the region, the crime window presents a number of at least one of a murder, a rape, a robbery, an assault, a burglary, an auto theft and an act of arson for a second time period for the region, the first period different from the second period, the crime window concurrently presenting data for the first period and for the second period such that a viewer can readily discern crime trends for the region.

2. The method of claim 1, wherein the mobile computing device determines, in real-time, the present location by communicating with a satellite.

3. The method of claim 1, wherein the mobile computing device determines, in real-time, the present location by signal triangulation via a plurality of cell sites.

4. The method of claim 1, wherein the tier of risk is a crime statistic stored in a crime statistic database.

5. The method of claim 4, wherein the crime statistic reflects a number of at least one of a murder, a rape, a robbery, an assault, a burglary, an auto theft and an act of arson over a time period.

6. The method of claim 1, wherein a zooming means is displayed over the marked map and the predefined marking technique is at least one of shading and coloring according to the tier of risk.

7. The method of claim 1, further comprising displaying the present location on the marked map, wherein the present location is within the region.

8. The method of claim 1, wherein the crime window presenting crime data for a current year to date, the event includes an inaction of a cursor pointing to the region for a predefined time period.

9. The method of claim 8, wherein the crime window concurrently presenting data for the first period and for the second period in a table format.

10. The method of claim 1, wherein upon a user selection of an emergency service point of interest on the marked map, an information window is displayed over the marked map, the information window displays a name and contact info of the point of interest.

11. The method of claim 1, wherein the escape icon is peripherally displayed over the marked map.

12. The method of claim 1, further comprising displaying a marking selection window over the marked map, wherein the marking window displays a marking selection icon, a label corresponding to at least one of a murder, a rape, a robbery, an assault, a burglary, an auto theft and an act of arson and a checkbox corresponding to the label and wherein upon selecting the marking icon, the marked map is displayed, the marking corresponding to the selected checkbox.

13. A computer program product for displaying a tier of risk in a region of a map displayed via a mobile computing device, the computer program product comprising:
    a tangible storage medium readable by a processing circuit and storing instructions for execution by the processing circuit for performing a method, the method comprising:
        displaying, in real-time on the map, a present location of the mobile computing device;
        retrieving data corresponding to the tier of risk for the region shown on the map;
        marking, according to a predefined marking technique, the region of the map according to the retrieved data; and displaying an escape icon over the marked map, wherein in response to selecting the escape icon, an emergency escape route from the present location to a safer location is displayed on the marked map based on the retrieved data, wherein upon an occurrence of an event, a crime trend window is displayed over the marked map, the crime window presents a name of the region and a number of at least one of a murder, a rape, a robbery, an assault, a burglary, an auto theft and an act of arson for a first time period for the region, the crime window presents a number of at least one of a murder, a rape, a robbery, an assault, a burglary, an auto theft and an act of arson for a second time period for the region, the first period different from the second period, the crime window concurrently presenting data for the first period and for the second period such that a viewer can readily discern crime trends for the region.

14. The computer program product of claim 13, wherein the mobile computing device determines, in real-time, the present location by communicating with a satellite.

15. The computer program product of claim 13, wherein the mobile computing device determines, in real-time, the present location by signal triangulation via a plurality of cell sites.

16. The computer program product of claim 13, wherein the tier of risk is a crime statistic stored in a crime statistic database.

17. The computer program product of claim 16, wherein the crime statistic reflects a number of at least one of a murder, a rape, a robbery, an assault, a burglary, an auto theft and an act of arson over a time period.

18. The computer program product of claim 13, wherein a zooming means is displayed over the marked map and the predefined marking technique is at least one of shading and coloring according to the tier of risk.

19. The computer program product of claim 13, further comprising displaying the present location on the marked map, wherein the present location is within the region.

20. The computer program product of claim 13, wherein the crime window presenting crime data for a current year to date, the event includes an inaction of a cursor pointing to the region for a predefined time period.

21. The computer program product of claim 20, wherein the crime window concurrently presenting data for the first period and the second period in a table format.

22. The computer program product of claim 13, wherein upon a user selection of an emergency service point of interest on the marked map, an information window is displayed over the marked map, the information window displays a name and contact info of the point of interest.

23. The computer program product of claim 13, wherein the escape icon is peripherally displayed over the marked map.

24. The computer program product of claim 13, further comprising displaying a marking selection window over the marked map, wherein the marking window displays a marking selection icon, a label corresponding to at least one of a murder, a rape, a robbery, an assault, a burglary, an auto theft and an act of arson and a checkbox corresponding to the label and wherein upon selecting the marking icon, the marked map is displayed, the marking corresponding to the selected checkbox.

25. A system for displaying a tier of risk in a region of a map displayed via a mobile computing device, the system comprising:
 a computer processor; and
 an application configured to execute on the computer processor, the application implementing a method, the method comprising:
  displaying, in real-time on the map, a present location of the mobile computing device;
  retrieving data corresponding to the tier of risk for the region shown on the map;
  marking, according to a predefined marking technique, the region of the map according to the retrieved data; and displaying an escape icon over the marked map, wherein in response to selecting the escape icon, an emergency escape route from the present location to a safer location is displayed on the marked map based on the retrieved data, wherein upon an occurrence of an event, a crime trend window is displayed over the marked map, the crime window presents a name of the region and a number of at least one of a murder, a rape, a robbery, an assault, a burglary, an auto theft and an act of arson for a first time period for the region, the crime window presents a number of at least one of a murder, a rape, a robbery, an assault, a burglary, an auto theft and an act of arson for a second time period for the region, the first period different from the second period, the crime window concurrently presenting data for the first period and for the second period such that a viewer can readily discern crime trends for the region.

26. The system of claim 25, wherein the mobile computing device determines, in real-time, the present location by communicating with a satellite.

27. The system of claim 25, wherein the mobile computing device determines, in real-time, the present location by signal triangulation via a plurality of cell sites.

28. The system of claim 25, wherein the tier of risk is a crime statistic stored in a crime statistic database.

29. The system of claim 28, wherein the crime statistic reflects a number of at least one of a murder, a rape, a robbery, an assault, a burglary, an auto theft and an act of arson over a time period.

30. The system of claim 25, wherein a zooming means is displayed over the marked map and the predefined marking technique is at least one of shading and coloring according to the tier of risk.

31. The system of claim 25, further comprising displaying the present location on the marked map, wherein the present location is within the region.

32. The system of claim 25, wherein the crime window presenting crime data for a current year to date, the event includes an inaction of a cursor pointing to the region for a predefined time period.

33. The system of claim 32, wherein the crime window concurrently presenting data for the first period and for the second period in a table format.

34. The system of claim 25, wherein upon a user selection of an emergency service point of interest on the marked map, an information window is displayed over the marked map, the information window displays a name and contact info of the point of interest.

35. The system of claim 25, wherein the escape icon is peripherally displayed over the marked map.

36. The system of claim 25, further comprising displaying a marking selection window over the marked map, wherein the marking window displays a marking selection icon, a label corresponding to at least one of a murder, a rape, a robbery, an assault, a burglary, an auto theft and an act of arson and a checkbox corresponding to the label and wherein upon selecting the marking icon, the marked map is displayed, the marking corresponding to the selected checkbox.

* * * * *